W. H. PRUDEN.
COMBINED CANDELABRUM AND FLOWER HOLDER.
APPLICATION FILED AUG. 8, 1907.
903,227.
Patented Nov. 10, 1908.
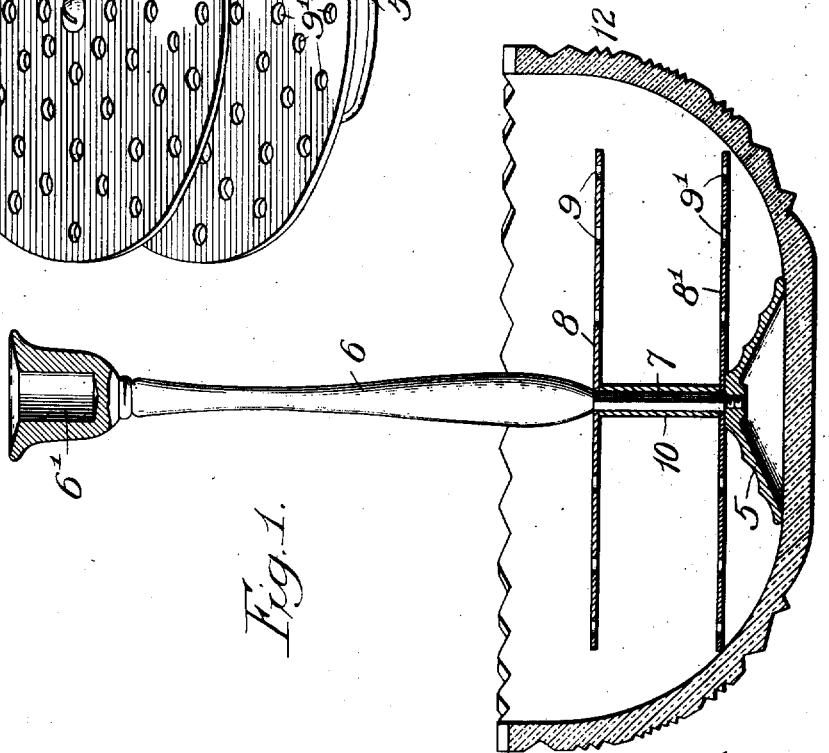

UNITED STATES PATENT OFFICE.

WILLIAM H. PRUDEN, OF CHICAGO, ILLINOIS.

COMBINED CANDELABRUM AND FLOWER-HOLDER.

No. 903,227.

Specification of Letters Patent.   Patented Nov. 10, 1908.

Application filed August 8, 1907.  Serial No. 387,651.

*To all whom it may concern:*

Be it known that I, WILLIAM H. PRUDEN, a citizen of the United States, residing at Chicago, in the county of Cook and State of Illinois, have invented certain new and useful Improvements in a Combined Candelabrum and Flower-Holder, of which the following is a specification.

My invention relates to improvements in ornamental flower holders and my object is to so combine a source of illumination with the flower support that the flowers shall be properly lighted and a pleasing ornamental effect obtained thereby.

Further objects and advantages will be made apparent in the following specification and claims.

Referring to the drawings—Figure 1 represents a side view with the principal parts in section. Fig. 2 is a perspective view of the device when modified to act as a flower support alone. Fig. 3 is a side view showing the candelabrum alone.

On the base 5 is mounted a standard 6, the lower end 7 having a square section. The parallel perforated plates 8 and 8′ have squared central holes corresponding to the part 7 and are held apart thereon by a sleeve 10. The perforations 9 and 9′ in the respective plates register with one another, this relation being secured by the squaring of the standard 7 and the plates 8, 8′, just referred to. The standard 6 is surmounted by a support for a source of illumination, shown in this case as a candle socket 6′.

The stems of flowers are passed through the respective pairs of registering holes 9 and 9′. If desired the plates 8, 8′ and the sleeve 10 can be removed and the remaining parts used simply as a candelabrum, as shown in Fig. 3. Also, if desired, the standard 6 may be removed and a long screw 11 substituted therefor, as shown in Fig. 2, thus making the flower holder alone available for use. When used as a flower support the structure may be set down in a vessel 12, thus permitting the stems of the flowers to be surrounded with water.

I claim:

1. In a holder for supporting flowers in a vessel containing water, the combination with a pedestal adapted to rest upon the bottom of the vessel, of parallel perforated plates mounted upon and extending radially around said pedestal for holding the stems of the flowers below the water in the vessel.

2. In a holder for supporting flowers in a vessel containing water, the combination with a pedestal comprising a base adapted to rest upon the bottom of the vessel, and a standard projecting above said base, of parallel perforated plates having central holes through which said standard extends, and means for spacing said plates apart so as to form separated supports through which the stems of the flowers extend and are supported below the water in the vessel.

3. In a holder for supporting flowers in a vessel containing water, the combination with a pedestal adapted to rest upon the bottom of the vessel, of substantially horizontal openwork supports mounted upon and extending radially around said pedestal for holding the stems of flowers below the water in the vessel, said pedestal being extended above the flowers, and means upon the upper end of the pedestal for supporting any suitable object.

WILLIAM H. PRUDEN.

Witnesses:
GEO. L. WILKINSON,
CARL A. RICHMOND.